United States Patent Office 2,716,042
Patented Aug. 23, 1955

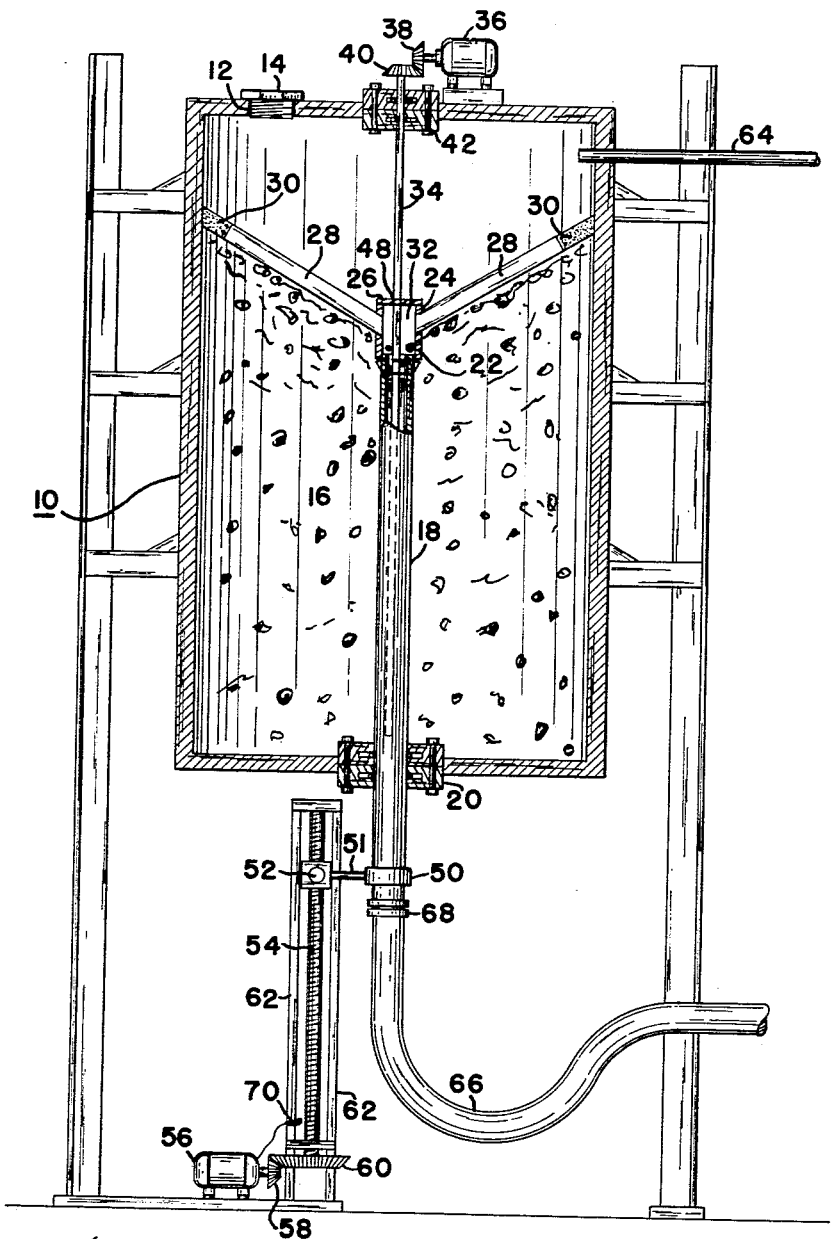
Fig. I

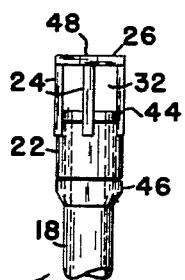
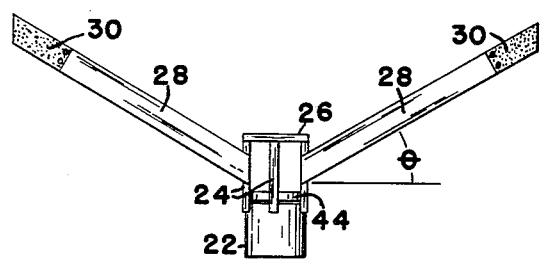
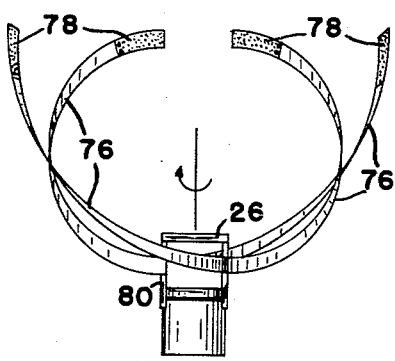
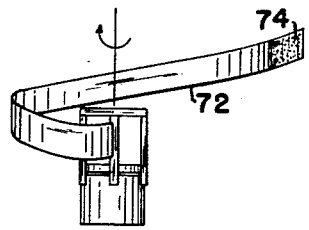
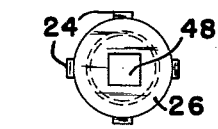

2,716,042

SOLIDS FEEDING DEVICE

Nels E. Sylvander, Bridgeville, and Sam A. Jones, Pittsburgh, Pa., assignors to Pittsburgh Consolidation Coal Company, Pittsburgh, Pa., a corporation of Pennsylvania Application August 18, 1951, Serial No. 242,542

6 Claims. (Cl. 302—42)

The present invention relates to an apparatus for feeding particulate solids and more particularly to an apparatus for feeding particulate solids at a constant rate.

Frequently it is desirable or necessary to feed materials at a constant rate. With gases or liquids, constant rate feeding presents few problems. However, when it is attempted to feed divided solid materials at a constant rate, measurement and control difficulties present serious obstacles, which are magnified when in addition, it is desired to feed the divided solids suspended uniformly in a stream of gases.

The primary object of the present invention is to provide an apparatus for feeding particulate solids, and especially finely divided solids, at a constant rate.

Another object of this invention is to provide an apparatus for injecting particulate solids into a stream of gases which serves to transport the solids at a constant rate.

According to our invention, a bed of particulate solids which are to be transported under non-gravity or elevated pressure conditions at a constant rate, is contained in an upright cylindrical vessel which is substantially airtight. The solids on the top of the bed are continuously swept by means of a rotating scraper into the open top of a vertically disposed discharge tube which is caused to descend at a predetermined constant arte. The rotating scraper is in constant engagement with the top layer of the solids bed so that the bed level descends at the said predetermined constant rate.

Carrier gases are introduced into the vessel at a point above the bed level and leave the vessel through the open top of the discharge tube, entraining therein the discharge solids to produce a homogeneous suspension which is delivered through the discharge tube.

While the present invention is particularly adapted to deliver small constant rate quantities of finely divided solids, the apparatus can be employed for feeding large particulate solids at constant rates which are limited only by the size of the apparatus.

For a better understanding of our invention, its operation, other objects and advantages, reference should be had to the following detailed description and to the drawings in which:

Figure I is an end view in elevation and partly in section, of an apparatus embodying our invention;

Figure II is an enlarged view of a portion of the apparatus shown in Figure I;

Figures III, IV, and V are enlarged views of modifications of the paddle arm assembly shown in Figure I;

Figure VI is an enlarged plan view of that portion of the apparatus which is shown in Figure II.

Referring to Figure I, an airtight cylindrical vessel 10 is mounted in an elevated, upright, vertical position. An opening 12 which can be sealed with a plug 14 is provided in the cylinder shell for introducing a fresh charge of particulate solids into the cylinder. Solids are introduced into vessel 10 to establish therein a bed of solids 16. An elongated cylindrical tube 18, located so that its longitudinal axis substantially coincides with the longitudinal axis of the vessel 10, is fitted into the vessel 10 through a stuffing box 20.

The discharge tube 18 terminates at its upper end in a lip bearing 44 (see Figure II). Sleeve member 22 fits slidably around the outside of the discharge tube 18 and rests upon a bearing 46 which is affixed to the outer wall of the discharge tube 18. Thus it is seen that the sleeve member 22 is free to rotate about the discharge tube 18 but is prevented from longitudinal motion with respect to the tube by the bearings 44 and 46. A frame work structure 24 encircles the open upper end of the discharge tube 18. A cap member 26, of disc-like configuration is supported in a substantially horizontal plane above the open end of the discharge tube by means of framework structure 24. One or more openings 32 in the framework structure permit carrier gases and solids to pass into the discharge tube 18. Paddle arms 28 affixed to and supported by the framework structure 24, have pliable tip members 30 of rubber, leather, cloth or the like, adapted to scrape the inner shell of the vessel 10. The bottom edges of the paddle arms 28 should not extend below the bottom of the discharge openings 32 in the framework structure 24.

The driving mechanism for sleeve member 22 and paddle arms 28 can best be understood by reference to Figures II and VI which are enlarged sectional views of the sleeve, framework structure, cap and upper discharge tube assembly. Corresponding numerals are employed to indicate corresponding elements.

The sleeve member 22 and the paddle arms 28 are rotated about the longitudinal axis of vessel 10 by means of a drive shaft 34 which is connected to a motor 36 by means of gears 38 and 40. If, as shown, the driving mechanism is located outside the vessel 10, a stuffing box 42 is provided to maintain the vessel 10 airtight.

As can be seen in Figure 6, an opening 48 of uniform square cross section is provided through the cap member 26. Referring again to Figure I, the drive shaft 34 which extends downwardly almost to the bottom of vessel 10, fits slidably through the opening 48 in the cap member 26 and extends downwardly through the center of the discharge tube 18. Drive shaft 34 has a uniform square cross section except at its upper end where a circular cross section is provided to permit rotation of the drive shaft in the stuffing box 42. The drive shaft 34 is associated with the cap 26 in such a fashion that the rotation of the drive shaft will cause rotation of the integral cap, framework structure, sleeve and paddle arm assembly.

The cross-sectional shape of the driving shaft 34 and of the opening 48 in cap member 26 need not be square, although a square cross section is preferred for ease of fabrication. Any non-circular cross-sectional shape in the drive shaft and the opening 48 will be satisfactory so long as the cap member 26 cannot rotate about the drive shaft 34 when said drive shaft is inserted through the opening 48.

Discharge tube 18 is caused to descend at a constant rate by any conventional mechanism. For example, a worm gear, clutch and clamp assembly as shown in Figure I may be used. A clamp member 50 is secured to the discharge tube 18 and is securely associated by means of a connecting element 51 with a clutch member 52. A vertical worm gear 54 is rotated by a constant speed motor 56 associated therewith through a set of gears 58 and 60. The clutch member 52 is adapted to engage the worm gear 54 and travel downwardly along said worm gear at a uniform rate when the worm gear rotates at a constant speed. Vertical support members 62 are provided to avoid stresses in the worm gear 54. The clamp 50 also serves to prevent rotation of the discharge tube 18.

Carrier gases for transporting solids enter the vessel 10 at a predetermined rate through a conduit 64 and pass downwardly through the openings 32 in the frame work structure 24 into the discharge tube 18 where they pick up the solids which are to be transported. The solids-in-gas suspension is transported from the discharge tube 18 through a flexible conduit 66 into a stationary conduit or directly to the point of use. The flexible conduit 66 is connected to the discharge tube 18 by means of coupling member 68.

The operation of the apparatus illustrated in Figure I will now be described.

Particulate solids are introduced into vessel 10 through opening 12 to establish a bed of solids 16 within the vessel 10. The discharge tube 18 is positioned so that the lower edges of the paddle arms 28 make contact with the upper surface of the solids bed 16. The motor 36 is started, causing the drive shaft 34 to rotate at a constant speed. The drive shaft in turn causes the cap 26, framework structure 24, sleeve member 22 and the paddle arms 28 to rotate as a unit about the stationary discharge tube 18. A thin layer of solids from the upper layer of the bed 16 is scraped by the paddle arms 28 toward the upper end of the discharge tube 18. These scraped solids reach the center of the upper layer of the bed and drop through the openings 32 in the framework structure 24 into the discharge tube 18.

The solids which are discharged during the start-up period, are collected at the bottom of the discharge tube 18 and can be used as feed material for a subsequent feeding operation cycle.

After a short period of paddle arm rotation, the upper surface of the solids bed corresponds to the configuration of the geometrical conical section generated by the rotation of the paddle arms and constant rate solids feeding may commence.

The opening 12 is sealed with the plug 14. The flexible tube 66 is connected to the vertical discharge tube 18 by fastening the coupling 68.

Clamp member 50 is then fastened to the discharge tube 18 at a point near the base of the vessel 10. Clutch member 52 is fastened to clamp member 50 by means of an appropriate connecting element 51 and is engaged with the worm gear 54. After the appropriate step down gears 58 and 60 have been engaged, constant speed motor 56 is started, causing worm gear 54 to rotate at a constant speed. Carrier gases are introduced into vessel 10 at a constant predetermined rate through conduit 64. The rotation of worm gear 54 causes clutch member 52, connecting element 51, clamp member 50 and discharge tube 18 to descend as a unit at a constant rate determined by the speed motor 56, the stepdown ratio of the gears 58 and 60 and the pitch of the worm gear 54.

Although the worm gear and clutch assembly are used for the purposes of illustration and are a preferred embodiment, nevertheless any convenient means may be employed which will serve to lower the discharge tube at a constant rate. For example, a simple winch and cable assembly might be used in place of the worm gear and clutch assembly shown.

As the discharge tube 18 descends, sleeve member 22 and its integral framework structure 24, cap element 26 and paddle arms 28 descend at the same rate, and the rotating paddle arms continuously scrape a uniform layer of solids from the upper surface of the bed 16. These solids pass through the openings 32 of the framework structure 24 and drop into discharge tube 18.

The openings in the framework structure should be sufficiently large to accommodate the maximum desired rate of solids feeding.

In general the rate of rotation of the paddle arms should be in the range of 4 to 80 R. P. M. for satisfactory results. We have found, however, that for a given solid material, slightly higher rates of rotation are desirable where the solid is moist than where the solid is dry in order to achieve uniform feeding operation.

Carrier gases enter the vessel 10 through conduit 64 at a constant predetermined rate and pass through openings 32 of the framework structure 24 into the discharge tube 18 where they pick up solids and carry them in a suspended stream through conduit 66 for transportation.

The solids feeding operation continues until the solids comprising the bed 16 have been exhausted. Thereupon the motors 36 and 56 are turned off, clutch member 52 is disengaged from worm gear 54 and the discharge tube 18 is elevated until the paddle arms 28 are near the top of vessel 10. A fresh charge of solids is introduced through opening 12 and the feeding cycle is repeated.

If desired, a relay contact 70 may be installed to stop the motor 56 when the clutch member 52 reaches the bottom of the worm gear 54. The downwardly moving clutch member 52 engages the relay contact 70 causing the motor 56 to turn off.

In some installations, it may be desirable to install at the bottom of the discharge tube 18 a single telescoping tube instead of the flexible conduit 66 which may not withstand very high pressures. In fact, where the apparatus is used for feeding solids under extremely elevated pressures, it may be necessary to resort to a telescoping delivery conduit.

By providing two feeding units in parallel, continuous constant rate solids feeding can be effected through cyclic operation in which one unit is feeding while the other unit is being charged and prepared for the succeeding feeding cycle.

The paddle arms employed in the apparatus of this invention can be modified in various forms without departing from the spirit of our invention. For example, as shown in Figures I and III, two flat wing-like paddle arms extending oppositely in the same plane may be employed. The lower edges of the paddle arms may be horizontal. Preferably, however, the lower edges of the paddle arms should be set at an angle $\theta$ which can be about 30° but preferably is slightly less than 30°.

A modified form of paddle is illustrated in Figure IV. This paddle 72 is constructed of a flat, narrow strip of sheet metal shaped in the form of a hyperbolic spiral. As shown, the paddle is rotated so that solids are scraped and moved positively toward the center of the containing vessel. With this form of paddle, solids tend to roll in advance of the paddle arm and collect in the area near the top of the discharge tube 18. When high feed rates are employed, solids will collect in such quantities that they flow over the top of the paddle. This difficulty can be circumvented by designing the lower edge of the paddle arm 72 so that in rotating it generates a cone whose base angle is approximately the angle of repose of the solids comprising the bed.

Figure V is a perspective view of another modified paddle arm structure in which thin, narrow strips of sheet metal form the paddle arms 76. A pliable tip member 78 is affixed at the end of each arm. Each individual paddle arm radiates upwardly from a framework element 80. In addition each paddle arm presents a concave surface to the solids bed as the arms rotate. The lower edges of each paddle arm generate upon rotation a substantially conical surface whose base angle is slightly less than the repose angle of the solids. The pliable tip members 78 continuously scrape the inner wall of the containing vessel. If desired, supporting rods may be affixed between the individual arms at points near the tips of the arms to strengthen the paddle structure. For additional support, a collar (not shown) with a square cross section opening adapted to engage the paddle arm drive shaft may be disposed directly above the cap 26 and held in position by a spider web frame of rods.

To insure constant rate feeding with our new apparatus, one important limitation should be observed, namely, that no pressure surges be permitted to develop within the cylindrical vessel containing the feed solids. So long as the pressure within the cylindrical vessel is constant, solids will be delivered at a constant rate. However, should the pressure decrease suddenly, the vapors in the interstices of the solids bed tend to expand and disperse the particles. In turn, the surface of the bed rises and a sudden surge of solids floods the discharge tube. If the pressure within the vessel is permitted to remain at the decreased value, the solids tend to resume their previous bulk density and the feed rate will resume its predetermined constant rate.

Conversely, when the pressure within the vessel increases suddenly, the solids bed is compacted somewhat and the solids feed rate is reduced until the altered conditions are equalized. Thus, it should be appreciated that the apparatus of this invention cannot tolerate sporadic fluctuations of pressure in the feed solids vessel. The adverse effects of this sensitivity to pressure surges can be minimized by obvious expedients, such as, for example, the installation of back pressure control valves in the solids delivery conduit.

By appropriate designing, the apparatus of the present invention can be adapted to supply solid particles at a constant rate in any desired quantities. The rate of solids delivery, with a feed vessel of given diameter can be accurately controlled by simply controlling the rate at which the discharge tube is caused to descend. For example, with the worm gear and clutch assembly which is the preferred driving mechanism for lowering the discharge tube, the solids feed rate is directly proportional to the rate at which the worm gear rotates. This rotation can be controlled step-wise by providing a series of interchangeable step-down gears; further intermediate control can be achieved by providing a regulatable constant speed driving motor.

With a feeding vessel of given diameter, the rate of paddle arm rotation should be increased slightly as the desired rate of feed is increased so that the paddle arms continuously scrape only a thin layer of solids from the upper surface of the solids bed.

To illustrate further the apparatus of this invention, a specific installation will be described for feeding pulverized coal of —14 Tyler mesh particle size. A 12-inch inner diameter cylindrical vessel was employed as the feed containing vessel. The discharge tube was a ½-inch nominal diameter stainless steel tube. The drive shaft for the paddle arm and sleeve assembly was a 3/16-inch square rod. Homogeneous solids-in-gas suspensions were obtained at gauge pressures up to about 20 pounds per square inch. The rate of solids withdrawal was uniform in the range from 0.3 lb./hr. to 58 lbs./hr. Carrier gases were introduced at a rate sufficient to produce a solids-in-gas suspension with a density of 3 lbs./cu ft. or less.

When feeding particulate solids by means of an apparatus according to our invention, it is seen that uniform rates are easily attainable; uneven slugs of solids which would cause high instantaneous feed rates are eliminated. Moreover, the feed solids are not fluidized, but are instead maintained in a fixed bed; thus there are no overhead losses of feed solids by elutriation. Our new apparatus can be designed for vacuum or high pressure solids feeding in addition to feeding at normal atmospheric pressures. The feed solids, furthermore, need not be dry in order that a homogeneous suspended solids stream be obtained. Continuous, uniform solids feeding can be effected by installing two or more feeding units in parallel.

According to the provisions of the patent statutes, we have explained the principle, preferred construction, and mode of operation of our invention and have illustrated and described what we now consider to represent its best embodiment. However, we desire to have it understood that, within the scope of the appended claims, the invention may be practised otherwise than as specifically illustrated and described.

We claim:

1. An apparatus for feeding particulate solid material at a constant rate comprising an upright cylindrical vessel adapted to confine a bed of particulate solids, an elongated gravity feed discharge tube substantially centrally positioned within said vessel and extending vertically through a substantially airtight seal in the bottom wall of said vessel, a supporting structure rotatable about the upper terminus of said discharge tube and incapable of longitudinal motion with respect to said discharge tube, said supporting structure having lateral openings therein to permit the flow of solids therethrough into the open top of said discharge tube, at least one paddle arm affixed to and supported by said rotatable supporting structure, said paddle arm being positioned with respect to the open top of said discharge tube to cause, upon rotation of said supporting structure, a movement of solids from the surface of said solids bed into the open top of said discharge tube, first mechanical driving means for rotating said rotatable supporting structure and second mechanical driving means independent of said first mechanical driving means for causing said discharge tube and said supporting structure to descend at a constant rate.

2. An apparatus for feeding particulate solid material at a constant rate comprising an upright substantially airtight cylindrical vessel having a top wall and a bottom wall and being adapted to confine a bed of particulate solids, an elongated gravity feed discharge tube substantially centrally positioned within said vessel and extending vertically through a substantially airtight seal in the bottom wall of said vessel, a rotatable sleeve member adapted to rotate about the upper terminus of said discharge tube and incapable of longitudinal motion with respect to said discharge tube, a framework structure affixed to and supported by said sleeve member and extending upwardly above the upper terminus of said discharge tube, a cap member immovably affixed to said framework structure, at least one paddle arm immovably affixed to said framework structure and extending radially to contact with the inner wall of said vessel, said paddle arm being positioned with respect to the open top of said discharge tube to cause, upon rotation of said framework structure, a movement of solids from the surface of said solids bed into said open top of said discharge tube, means for rotating said sleeve, framework structure, cap and paddle arm as a unit about the longitudinal axis of said vessel, mechanical driving means for causing said discharge tube to descend at a constant rate, and means for introducing carrier gases into said vessel.

3. The apparatus of claim 2 in which the lower edge of each paddle arm generates upon rotation a geometric cone whose base angle is in the range from 0° to an angle equal to the angle of repose of the solid material comprising the bed of solids in said vessel.

4. An apparatus for feeding particulate solid material at a constant rate comprising an upright substantially airtight cylindrical vessel having a top wall and a bottom wall and being adapted to confine a bed of particulate solids, an elongated gravity feed discharge tube substantially centrally vertically positioned within said vessel and extending upwardly through a substantially airtight seal in the center of the bottom wall of said vessel, a rotatable sleeve member adapted to rotate about the upper terminus of said discharge tube and incapable of longitudinal motion with respect to said discharge tube, a framework structure affixed to and supported by said sleeve member and extending upwardly above the open upper terminus of said discharge tube, a cap member immovably affixed to said framework structure, at least one paddle arm immovably affixed to said framework structure and extending radially outwardly, a pliable tip at the radial extremity of said paddle arm adapted to make continuous contact with the inner side wall of said vessel, said paddle arm being positioned with respect to the open top of said discharge tube to cause, upon rotation of said framework structure, a movement of solids from the surface of said solids bed into said open top of said solids discharge tube, a drive shaft of non-circular cross section substantially centrally positioned within said vessel and extending vertically downwardly into said discharge tube through a channel extending vertically through the top wall of said cap member, the cross section of said channel being similar to that of said drive shaft so that said cap member is free to slide longitudinally along said drive shaft but cannot rotate about said drive shaft, means for rotating said drive shaft, mechanical driving means for causing said discharge tube to descend at a constant rate, and means for introducing carrier gases into said vessel.

5. An apparatus for feeding particulate solid material at a constant rate comprising an upright substantially airtight cylindrical vessel having a top wall and a bottom wall, adapted to confine a bed of particulate solids, an elongated discharge tube substantially centrally vertically positioned within said vessel and extending upwardly through a substantially airtight seal in the center of the bottom wall of said vessel, a rotatable sleeve member adapted to rotate about the upper terminus of said discharge tube and incapable of longitudinal motion with respect to said discharge tube, a framework structure affixed to and supported by said sleeve member and extending upwardly above the upper terminus of said discharge tube, a cap member immovably affixed to said framework structure, at least one paddle arm immovably affixed to said framework structure and extending radially outwardly, a pliable tip at the radial extremity of said paddle arm adapted to make continuous contact with the inner side wall of said vessel, means for rotating said sleeve, framework structure, cap and paddle arm as a unit about the longitudinal axis of said vessel, a clamp adapted to be affixed to said discharge tube at a point external to said vessel, a vertically disposed worm gear, means for causing said worm gear to rotate at a constant speed, a clutch member adapted to engage said worm gear and to move longitudinally downward along said worm gear when said worm gear is rotated, means for securing said clutch member to said clamp, and means for introducing carrier gases into said vessel.

6. In an apparatus for feeding particulate solids at constant rates, the combination comprising a vertically disposed solids discharge tube open at both ends, adapted for vertically longitudinal motion only, a rotatable sleeve member adapted to encircle said discharge tube at its upper terminus, adapted to rotate about said discharge tube and secured to prevent longitudinal motion with respect to said tube, a framework structure having lateral openings therein to permit the passage of particulate solids therethrough, said structure affixed to and supported by said sleeve and extending longitudinally above the upper terminus of said discharge tube, a cap member of disc-like configuration having a non-circular vertical opening therethrough, said cap member disposed perpendicularly to the longitudinal axis of said discharge tube and affixed to and supported by said framework structure, at least one paddle arm affixed to and supported by said framework structure and extending radially outwardly therefrom, a vertically disposed drive shaft of non-circular cross section, slidably engageable with the opening in said cap member and depending into said discharge tube, said drive shaft incapable of rotation with respect to said cap member, and means for rotating said drive shaft.

References Cited in the file of this patent

UNITED STATES PATENTS

| 309,110 | Thompson | Dec. 9, 1884 |
| 554,300 | Parker | Feb. 11, 1896 |
| 659,112 | Sykes | Oct. 2, 1900 |
| 670,582 | Erisman | Mar. 26, 1901 |
| 1,075,193 | Cole | Oct. 7, 1913 |
| 1,811,461 | Elliott | June 23, 1931 |
| 2,375,766 | Britcher | May 15, 1945 |
| 2,500,043 | Radtke | Mar. 7, 1950 |
| 2,587,714 | Embree | Mar. 4, 1952 |

FOREIGN PATENTS

| 547,957 | Great Britain | Sept. 21, 1942 |